(12) United States Patent
Rozenstrauch et al.

(10) Patent No.: US 6,862,273 B2
(45) Date of Patent: Mar. 1, 2005

(54) METHOD AND APPARATUS FOR PROVIDING DISPATCH SCAN IN A CDMA COMMUNICATION SYSTEM

(75) Inventors: Alexander Rozenstrauch, Buffalo Grove, IL (US); Rajendra Panchal, Algonquin, IL (US)

(73) Assignee: Motorola, Inc., Schaumburg, IL (US)

(*) Notice: Subject to any disclaimer, the term of this patent is extended or adjusted under 35 U.S.C. 154(b) by 792 days.

(21) Appl. No.: 09/757,935

(22) Filed: Jan. 10, 2001

(65) Prior Publication Data

US 2003/0012157 A1 Jan. 16, 2003

(51) Int. Cl.[7] ............................................. H04B 7/216
(52) U.S. Cl. ....................... 370/335; 370/342; 455/518
(58) Field of Search ................................. 370/335, 328, 370/329, 342, 312, 390, 431, 441, 442, 479; 455/403, 422.1, 426.1, 426.2, 450, 458, 518, 519

(56) References Cited

U.S. PATENT DOCUMENTS 5,056,109 A  10/1991  Gilhousen et al. ........... 370/342
5,216,692 A   6/1993  Ling ............................ 375/130

(List continued on next page.)

FOREIGN PATENT DOCUMENTS

EP           0 828 355 A2      3/1998

OTHER PUBLICATIONS

U.S. Appl. No. 09/588,262, filed Jun. 6, 2000.
U.S. Appl. No. 09/065,278, filed Apr. 23, 1998.

*Primary Examiner*—Brian Nguyen
(74) *Attorney, Agent, or Firm*—Jeffrey K. Jacobs

(57) ABSTRACT

A CDMA base site provides dispatch group call service to members of a dispatch group by using a first long-code mask. The base site also repeatedly transmits the group call's channel assignment so that a scanning communication unit can detect that the call is active. In order for the scanning communication unit to decode the dispatch communication once the call is detected, it requests a long-code mask transition from the base site. The base site then transmits a new long-code mask and begins encoding the dispatch communication using the new mask. Thus, the scanning communication unit is able decode the communication and thereby join the active CDMA dispatch group call.

15 Claims, 2 Drawing Sheets

U.S. PATENT DOCUMENTS

| | | | | |
|---|---|---|---|---|
| 5,257,183 A | | 10/1993 | Tam | 378/4 |
| 5,265,119 A | | 11/1993 | Gilhousen | 370/335 |
| 5,267,262 A | | 11/1993 | Wheatley, III | 455/522 |
| 5,323,452 A | | 6/1994 | Dickman et al. | 379/201.04 |
| 5,383,219 A | | 1/1995 | Wheatley, III et al. | 370/342 |
| 5,485,486 A | | 1/1996 | Gilhousen et al. | 370/335 |
| 5,548,808 A | | 8/1996 | Bruckert et al. | 455/442 |
| 5,590,177 A | | 12/1996 | Vilmur et al. | 455/436 |
| 5,613,209 A | | 3/1997 | Peterson et al. | 455/518 |
| 5,621,723 A | | 4/1997 | Walton, Jr. et al. | 370/335 |
| 5,691,979 A | | 11/1997 | Cadd et al. | 370/312 |
| 5,711,011 A | | 1/1998 | Urs et al. | 455/520 |
| 5,797,097 A | | 8/1998 | Roach, Jr. et al. | 455/456.2 |
| 5,852,781 A | | 12/1998 | Ahvenainen | 455/509 |
| 5,878,038 A | | 3/1999 | Willey | 370/335 |
| 5,881,058 A | | 3/1999 | Chen | 370/335 |
| 5,881,368 A | | 3/1999 | Grob et al. | 455/69 |
| 5,887,252 A | | 3/1999 | Noneman | 455/463 |
| 5,914,958 A | * | 6/1999 | Chinitz et al. | 370/441 |
| 5,920,549 A | | 7/1999 | Bruckert et al. | 370/331 |
| 5,960,356 A | | 9/1999 | Alperovich et al. | 455/458 |
| 5,960,362 A | * | 9/1999 | Grob et al. | 455/527 |
| 5,983,099 A | * | 11/1999 | Yao et al. | 455/426.1 |
| 5,987,012 A | | 11/1999 | Bruckert et al. | 370/331 |
| 6,005,848 A | | 12/1999 | Grube et al. | 370/266 |
| 6,058,308 A | | 5/2000 | Kallin et al. | 455/432.3 |
| 6,115,388 A | | 9/2000 | Chinitz et al. | 370/441 |
| 6,169,906 B1 | | 1/2001 | Bruckert | 455/518 |
| 6,178,166 B1 | | 1/2001 | Wilson et al. | 370/335 |
| 6,181,685 B1 | | 1/2001 | Chinitz et al. | 370/335 |
| 6,188,767 B1 | | 2/2001 | Needham et al. | 380/271 |
| 6,233,461 B1 | | 5/2001 | Chinitz et al. | 455/522 |
| 6,295,284 B1 | * | 9/2001 | Maggenti | 370/328 |
| 6,333,921 B1 | | 12/2001 | Grube et al. | 370/312 |
| 6,373,829 B1 | * | 4/2002 | Vilmur | 370/335 |
| 6,519,239 B1 | * | 2/2003 | Panchal et al. | 370/335 |
| 6,671,515 B1 | * | 12/2003 | Needham et al. | 455/458 |

* cited by examiner

METHOD AND APPARATUS FOR PROVIDING DISPATCH SCAN IN A CDMA COMMUNICATION SYSTEM

CROSS-REFERENCE TO RELATED APPLICATION

This application is related to a co-pending application, "METHOD AND APPARATUS FOR PROVIDING DISPATCH SERVICE IN A CDMA COMMUNICATION SYSTEM", Ser. No. 09/443,538, filed on Nov., 19, 1999, assigned to the assignee of the present application, which prior application is hereby incorporated by reference verbatim, with the same effect as though the prior application were fully and completely set forth herein.

FIELD OF THE INVENTION

The present invention relates generally to the field of wireless communications and, more particularly, to dispatch scan on code division multiple access (CDMA) communication systems.

BACKGROUND OF THE INVENTION

Communication systems today, such as Motorola's "iDEN" system, provide users with so-called dispatch services. Unlike the interconnect services provided by today's cellular systems, dispatch services have been traditionally provided by two-way radio systems. Such services allow a user to communicate in ways that are difficult or costly using today's cellular systems. The dispatch group call service, for example, enables a user to communicate with a group of people simultaneously and instantaneously, usually just by depressing a push-to-talk (PTT) button. Using a cellular system, such a call could not occur instantaneously since either telephone numbers would need to be dialed for a three-way call or arrangements would need to be made to setup a conference call.

Likewise, the dispatch individual call service enables a user to communicate with another user quickly and spontaneously. This feature is ideal for two people who are working together but are unable to speak with one another directly such as two people working in concert but in different parts of a building. Where a wireless telephone call is more appropriate for a conversation, short messages between two people as they work are better facilitated by the dispatch individual call service.

Both of these dispatch services are made more flexible by a so-called dispatch scan service that allows a user to scan for call activity across multiple dispatch groups. For example, a user involved in a dispatch group or individual call can simultaneously scan for any call activity occurring among members of a different dispatch group and join such a call while in-progress. Thus, a user, such as a supervisor, can effectively monitor a number of different dispatch groups and take part in their calls as required.

Although these dispatch services are available to users of Motorola's "iDEN" system, they are not available on today's CDMA systems. The co-pending application "METHOD AND APPARATUS FOR PROVIDING DISPATCH SERVICE IN A CDMA COMMUNICATION SYSTEM" discloses modifications to the IS-95 CDMA standard to allow the members of a dispatch group to decode the group communication. For example, the CDMA long-code mask used to encode the communication is generated using a dispatch identifier instead of the Electronic Serial Number (ESN). Also, a dispatch identifier is used to determine the appropriate paging resource for transmitting and receiving dispatch call pages. However, this co-pending application does not disclose a CDMA embodiment that enables the dispatch scan service. Therefore, a need exists for an apparatus and method for providing a dispatch scan service on a CDMA communication system.

DESCRIPTION OF A PREFERRED EMBODIMENT

In general, the present invention discloses a method and an apparatus that provide dispatch scan in a CDMA communication system. A communication unit that joins a dispatch call already in-progress is unable to decode the group communication because it does not have the long code mask required to decode it. The present invention provides the use of a long code transition for the dispatch call in order that the joining unit uses the same long code mask as the other units already participating in the call.

Figure 1:
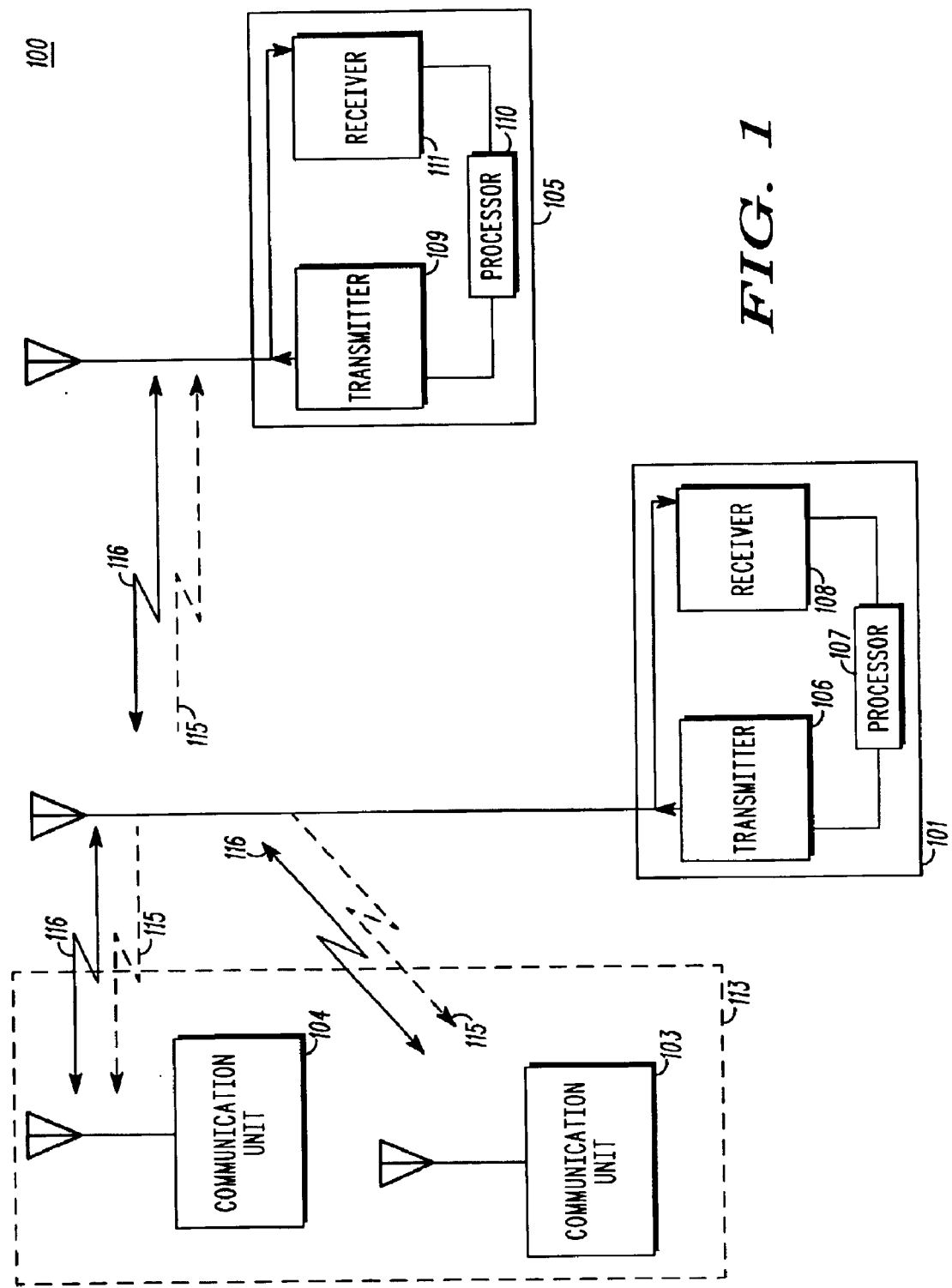
FIG. 1 is a block diagram depiction of a CDMA communication system in accordance with a preferred embodiment of the present invention.
Figure 2:
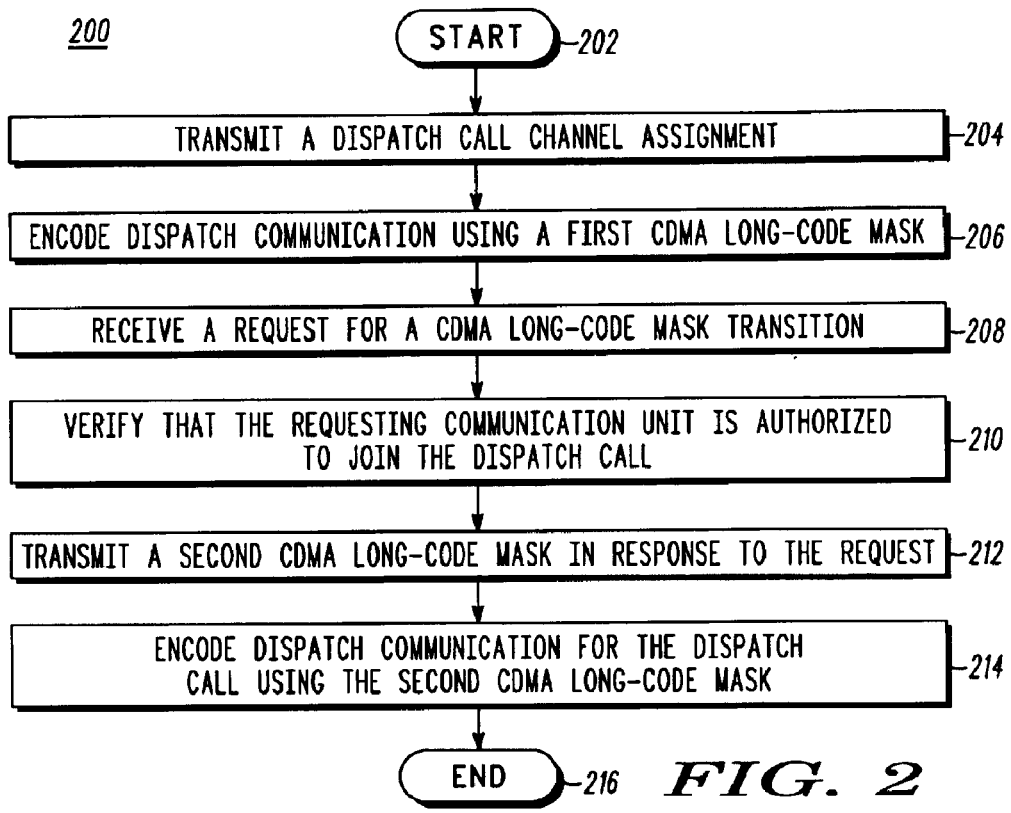
FIG. 2 is a logic flow diagram of steps executed by a base site in accordance with a preferred embodiment of the present invention.
Figure 3:
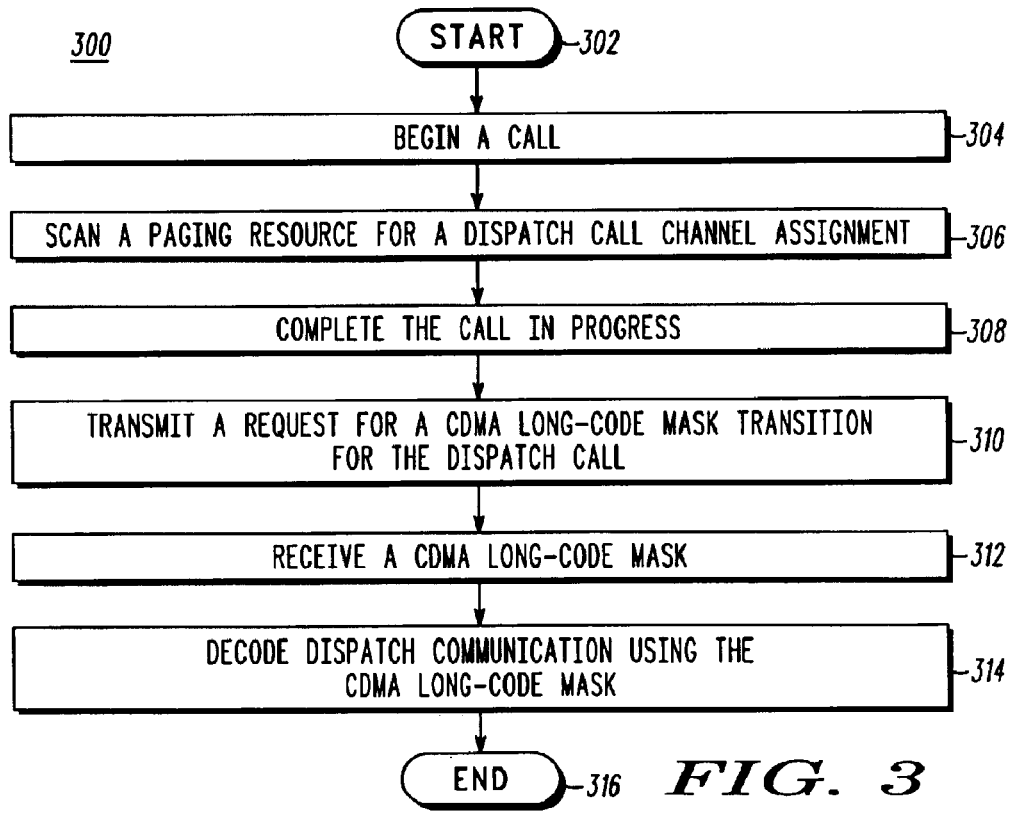
FIG. 3 is a logic flow diagram of steps executed by a communication unit in accordance with a preferred embodiment of the present invention.

The present invention can be more fully understood with reference to FIGS. 1–3. FIG. 1 is a block diagram depiction of a CDMA communication system 100 in accordance with a preferred embodiment of the present invention. Preferably, the CDMA communication system 100 is a system in accordance with the well-known Telecommunications Industry Association/Electronic Industries Association Standard 95 (TIA/EIA IS-95-B) modified as described below to implement the present invention and modified as described in co-pending application "METHOD AND APPARATUS FOR PROVIDING DISPATCH SERVICE IN A CDMA COMMUNICATION SYSTEM" to provide dispatch group and individual service. CDMA communication system 100 could alternatively be based upon the TIA/EIA IS-2000 (CDMA 2000) standard rather than IS-95.

CDMA communication system 100 comprises fixed network equipment and mobile communication units. The fixed network equipment includes a base site 101 that is preferably networked to other base sites, controllers, and switches, all part of the fixed network equipment of system 100 and all well known to those skilled in the art. For simplicity, only base site 101 of the fixed network equipment is shown in FIG. 1. Again for simplicity, only three of what could be thousands of mobile communication units are shown in FIG. 1. Communication units 103–105 each preferably comprise CDMA-capable wireless phones. They communicate with base site 101 via a CDMA air interface that comprises coded-channel communication resources 115 and 116. In an alternative embodiment, however, the communication units could comprise any communication device capable of communicating via a CDMA air interface.

Each of the communication units 103–105 comprises a common set of elements, a transmitter, a receiver, and a processor. In particular, processor 110, which typically comprises one or more processing devices (e.g., microprocessors, digital signal processors, etc.) and memory devices, is coupled to a transmitter 109 and a receiver 111. Each of these elements is well-known in the art. In the preferred embodiment, under the control of software algorithms stored in the memory devices of processor 110 and in cooperation with the other elements shown, the processor 110 performs those tasks required for operation of the communication unit, including the method described relative to FIG. 3.

Similarly, base site 101 comprises elements well-known in the art, a transmitter 106, a receiver 108, and a processor 107. Coupled to transmitter 106 and receiver 108, processor 107 preferably comprises memory devices and processing devices such as a microprocessor and digital signal processor. In the preferred embodiment, under the control of software algorithms stored in the memory devices of processor 107 and in cooperation with the other elements shown, the processor 107 performs those tasks required for operation of the base site, including the method described relative to FIG. 2.

Operation of the preferred CDMA communication system 100, in accordance with the present invention, occurs substantially as follows. Communication units 103 and 104 are, for the purpose of illustration, logically arranged into a dispatch group (or talkgroup) 113 that is involved in a dispatch group call supported by base site 101. Preferably, processor 107 instructs base site transmitter 106 to repeatedly transmit an IS-95 (or CDMA 2000) CHANNEL_ASSIGNMENT for the dispatch call via CDMA paging resource 115. Also, processor 107 encodes the dispatch communication for the dispatch call using a first CDMA long-code mask.

The dispatch scan service allows the user of communication unit 105 to monitor for and join the dispatch call in-progress. Communication unit receiver 111 scans paging resource 115 for a channel assignment for the dispatch call. Since the dispatch call is in progress, the communication unit 111 will receive the channel assignment. However, communication unit 111 will not be able to decode the dispatch communication of the dispatch call on CDMA traffic channel 116 since base site 101 and communication units 103 and 104 are using the first CDMA long-code mask to encode/decode the communication. Preferably, communication units 103 and 104 received the long-code mask at the beginning of the call, i.e., before communication unit 105 was attempting to join. Therefore, communication unit processor 110 instructs transmitter 109 to transmit a request for a CDMA long-code mask transition for the dispatch call. Preferably, communication unit 105 transmits this request using an IS-95 (or CDMA 2000) ORDER message via CDMA traffic channel 116. Alternatively however, this request may be transmitted via a CDMA access channel.

Base site receiver 108 receives the request for a CDMA long-code mask transition and in response processor 107 instructs the transmitter 106 to transmit a second CDMA long-code mask. Preferably, the second CDMA long-code mask is transmitted within an IS-95 (or CDMA 2000) ORDER message via traffic channel 116. The communication unit receiver 111 receives the second CDMA long-code mask as do communication units 103 and 104. Base site processor 107 switches from using the first CDMA long-code mask to using the second to encode dispatch communication for the dispatch group call. Thus, processor 110 can now decode the dispatch communication and effectively join the dispatch call while in-progress.

FIG. 2 is a logic flow diagram 200 of steps executed by a base site in accordance with a preferred embodiment of the present invention. Preferably, this method is embodied in the software stored in the memory devices of CDMA base sites and used to provide dispatch scan service to the communication units of the CDMA communication system.

The logic flow begins (202) when the base site transmits (204) a channel assignment for a dispatch call via a paging resource. The base site then encodes (206) dispatch communication for the dispatch call using a first CDMA long-code mask. Upon receiving (208) a request for a CDMA long-code mask transition for the dispatch call from a communication unit, the base site preferably verifies (210) that the communication unit is authorized to join the dispatch call. Such authorization checking is well known in the art and typically involves checking a database for the appropriate stored privileges. Upon verifying authorization, the base site transmits (212) a second CDMA long-code mask for the dispatch call. Finally, having transmitted the second mask to the requesting communication unit and the communication units already participating in the call, the base site begins encoding (214) the dispatch communication of the dispatch call using the second CDMA long-code mask, and the logic flow for the base site ends (216). Thus, the requesting communication unit is now able to decode the dispatch communication using the second CDMA long-code mask.

FIG. 3 is a logic flow diagram 300 of steps executed by a communication unit in accordance with a preferred embodiment of the present invention. Preferably, this method is embodied in the software stored in the memory devices of the communication units and used to obtain dispatch scan service from the base sites of a CDMA communication system.

The logic flow begins (302) when the communication unit begins (304) a call or communication service. In addition to this communication activity, the communication unit user may also desire to monitor the call activity of a specific dispatch group. Preferably then either the user or the user's pre-programming triggers the communication unit to scan (306) a paging resource for a dispatch call channel assignment for that specific dispatch group. In the preferred embodiment, when the scanning detects a dispatch call channel assignment, the user may complete (308) the call in-progress, and then in order to join the dispatch group call, transmit (310) a request for a CDMA long-code mask transition. One skilled in the art will note that the step of completing a call in-progress may be no more than abruptly ending that call or service. In response to the request, the communication unit receives (312) a CDMA long-code mask for the dispatch call. The communication unit can then begin decoding (314) the dispatch communication of the dispatch group call using the CDMA long-code mask, and the logic flow for the communication unit ends (316).

Logic flow diagram 300 illustrates a scenario in which a communication unit begins (304) a call and then completes (308) the call before attempting to join the dispatch group call. In practice, the communication unit may be idle with respect to other communication services and yet monitoring for call activity by scanning for a channel assignment. In this scenario, steps 304 and 308 would not be part of the method performed.

The present invention, in the manner described above, provides a dispatch scan service to communication units in a CDMA communication system that supports dispatch communication. Specifically, in the preferred embodiment of the invention, a CDMA base site provides dispatch group call service to members of a dispatch group by using a first long-code mask. The base site also repeatedly transmits the group call's channel assignment so that a scanning communication unit can detect that the call is active. In order for the scanning communication unit to decode the dispatch communication once the call is detected, it requests a long-code mask transition from the base site. The base site then transmits a new long-code mask and begins encoding the dispatch communication using the new mask. Thus, the scanning communication unit is able to decode the communication and thereby join the active call.

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims and their equivalents.

What is claimed is:

1. A method for a base site to provide a dispatch scan service to a communication unit in a CDMA communication system, the method comprising the steps of:

transmitting, by the base site, a channel assignment for a dispatch call via a paging resource;

encoding, by the base site, dispatch communication for the dispatch call using a first CDMA long-code mask;

receiving, by the base site, a request for a CDMA long-code mask transition for the dispatch call;

transmitting, by the base site, a second CDMA long-code mask for the dispatch call in response to the request; and encoding, by the base site, dispatch communication for the dispatch call using the second CDMA long-code mask after transmitting the second COMA long-code mask.

2. The method of claim 1 wherein the dispatch call is a group dispatch call.

3. The method of claim 1 wherein the step of transmitting the channel assignment further comprises the step of repeatedly transmitting the channel assignment for the duration of the dispatch call.

4. The method of claim 1 wherein the second COMA long-code mask is transmitted to a communication unit from which the request was received.

5. The method of claim 4 further comprising the step of verifying that the communication unit is authorized to join the dispatch call before transmitting the second CDMA long-code mask.

6. The method of claim 4 wherein the second CDMA long-code mask is transmitted via a traffic channel of the dispatch call, thereby transmitting the second CDMA long-code mask to participants of the dispatch call in addition to the communication unit from which the request was received.

7. The method of claim 4 wherein the second CDMA long-code mask is transmitted via an access channel.

8. A method for a communication unit to obtain dispatch scan service from a base site in a CDMA communication system, the method comprising the steps of:

scanning, by the communication unit, a paging resource for a channel assignment for a dispatch call;

transmitting, by the communication unit, a request for a CDMA long-code mask transition for the dispatch call, which is encoded using an initial CDMA long-code mask at least before transmitting the request for a CDMA long-code mask transition;

receiving, by the communication unit, a CDMA long-code mask for the dispatch call; and decoding, by the communication unit, dispatch communication using the CDMA long-code mask for the dispatch call.

9. The method of claim 8 wherein the dispatch call is a group dispatch call.

10. The method of claim 8 wherein the request for a CDMA long-code mask transition is transmitted via a traffic channel of the dispatch call.

11. The method of claim 8 wherein the request for a CDMA long-code mask transition is transmitted via an access channel.

12. The method of claim 8 further comprising the step of completing a call in-progress before transmitting the request for a CDMA long-code mask transition.

13. A base site comprising:

a transmitter capable of transmitting a channel assignment for a dispatch call via a paging resource and of transmitting a second CDMA long-code mask for the dispatch call in response to a request for a CDMA long-code mask transition for the dispatch call;

a receiver capable of receiving the request; and a processor capable of instructing the transmitter to transmit the channel assignment, of encoding dispatch communication for the dispatch call using a first CDMA long-code mask, of instructing the transmitter to transmit the second CDMA long-code mask, and of encoding dispatch communication for the dispatch call using the second CDMA long-code mask after the transmitter transmits the second CDMA long-code mask.

14. The base site of claim 13 wherein the processor is capable of instructing the transmitter to transmit the channel assignment repeatedly for the duration of the dispatch call.

15. A communication unit comprising:

a receiver capable of scanning a paging resource for a channel assignment for a dispatch call and of receiving a CDMA long-code mask for the dispatch call;

a transmitter capable of transmitting a request for a CDMA long-code mask transition for the dispatch call, which is encoded using an initial CDMA long-code mask at least before transmitting the request for a CDMA long-code mask transition;

a processor capable of instructing the transmitter to transmit the request and of decoding dispatch communication using the CDMA long-code mask for the dispatch call.

* * * * *